Jan. 30, 1962   I. M. DAVIDSON   3,018,983
JET AIRCRAFT WITH JET DEFLECTOR
Filed Oct. 10, 1958   3 Sheets-Sheet 1

Inventor
Ivor Macaulay Davidson
By
Stevens, Davis, Miller & Mosher
his Attorneys

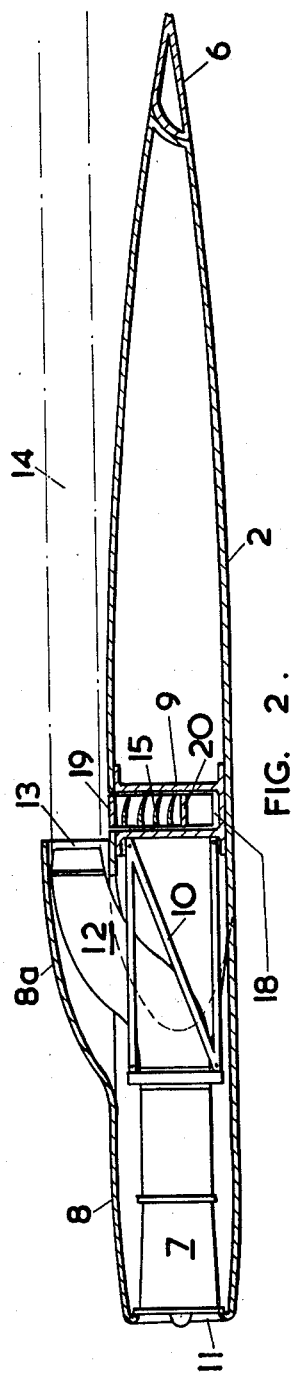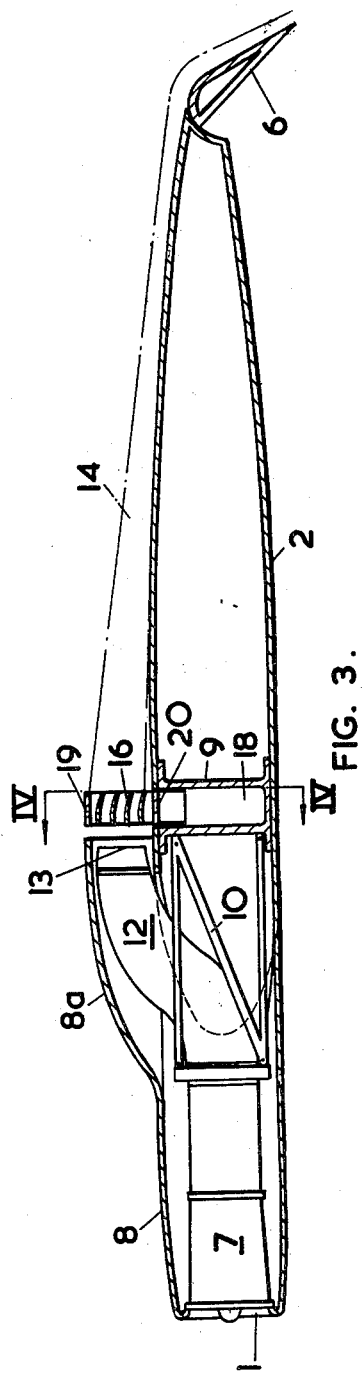

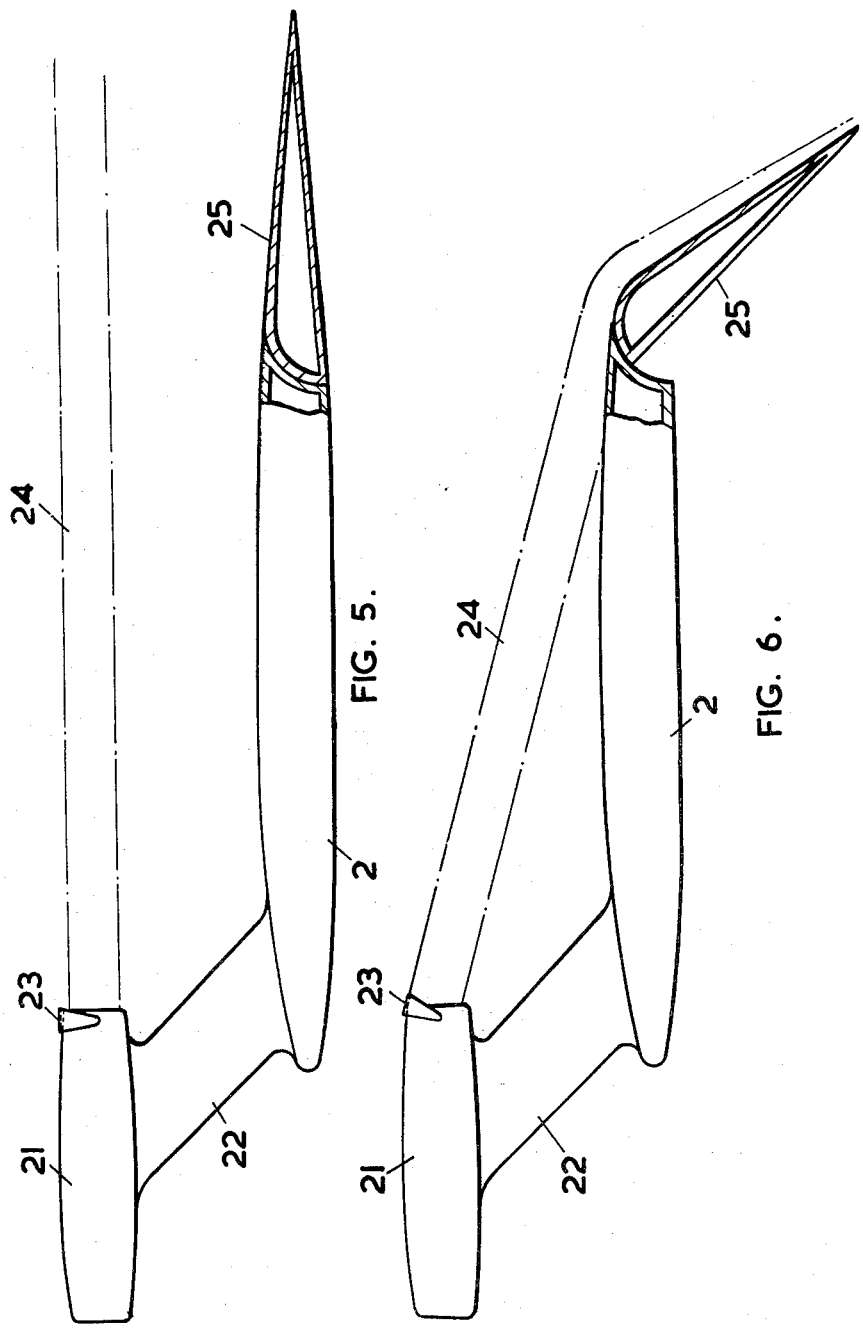

ered Jan. 30, 1962

3,018,983
JET AIRCRAFT WITH JET DEFLECTOR
Ivor Macaulay Davidson, Farnborough, England, assignor to Power Jets (Research and Development) Limited, London, England, a British company
Filed Oct. 10, 1958, Ser. No. 766,577
Claims priority, application Great Britain Oct. 16, 1957
5 Claims. (Cl. 244—15)

This invention relates to aircraft operating on the "jet flap" or "jet-augmented flap" principle. Examples of proposed jet flap aircraft are described in prior British patent specifications Nos. 758,269, 787,011–5, 790,193–4 and 790,298, and the principles involved are discussed in a paper by the present inventor published in the Journal of the Royal Aeronautical Society of January 1956.

One of the major difficulties arising in a jet flap aircraft lies in the mounting of the engines. Earlier proposals are described in prior patent specifications Nos. 758,269 and 787,013, and the present invention in some aspects provides an alternative to the arrangements of these earlier proposals.

According to the present invention, there is provided an aircraft wing having at least one jet engine mounted thereon with its jet nozzle arranged above the wing upper surface so that a jet stream is discharged therefrom rearwardly over and clear of the surface, and means operable to deflect the jet stream downwardly so that it impinges on and spreads out lateraly across the surface in a spanwise sense and leaves the wing trailing edge as a long thin spanwise-extending jet sheet.

The wing may have a trailing edge wing flap arranged so that the jet sheet follows its upper surface, the flap being movable to a position in which it causes the jet sheet to be discharged in a downwardly inclined direction.

There may be a jet deflector operable to deflect the jet stream and the jet deflector may be movable between an inoperative position in which it is housed within the wing and an operative position in which it deflects the jet stream. Alternatively the jet deflector may be mounted on the engine jet nozzle.

The engine may be mounted in a nacelle extending forwardly from the wing leading edge or in a pod supported above the wing and there may be a plurality of engines distributed along the wing span, the jet streams of which, when deflected, may combine to form a jet sheet extending continuously along a major part of the wing span.

The invention further provides an aircraft having a pair of wings as aforesaid.

Certain embodiments of the invention will now be described by way of example with reference to the accompanying drawings, of which:

FIGURE 2 is a fore and aft sectional view through one wing of the aircraft, the section being taken on the line II—II in FIGURE 1.

FIGURE 3 is a sectional view corresponding to that of FIGURE 2 showing the jet stream deflected in a downward direction;

FIGURES 5 and 6 are sectional views corresponding to FIGURES 2 and 3 of an alternative embodiment of the invention.

Figure 1:
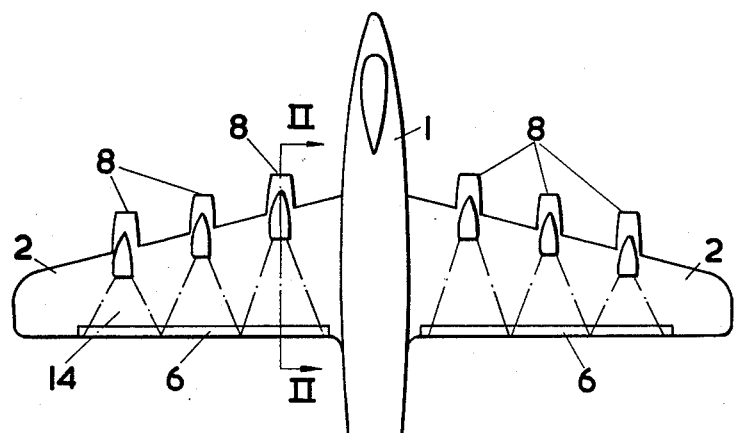
FIGURE 1 is a diagrammatic plan view of an aircraft.

As shown in FIGURES 1 and 2, the aircraft comprises a fuselage 1, a pair of wings 2 attached thereto one on each side thereof, and a tail unit comprising the usual horizontal stabiliser or tailplane 3 with elevators 4 and a fin and rudder 5. The rear of each wing is formed as a trailing edge wing flap 6.

The aircraft is powered by six gas turbine jet propulsion engines 7, three mounted on each wing. The engines are spaced from one another along the leading edge of each wing and each of them is housed in a nacelle 8 extending from the wing leading edge and as shown in FIGURE 2 is supported from the front main spar 9 of the wing by a framework 10 in conventional manner. Each engine has an air intake 11 in the forward end of the nacelle and a cranked jet pipe 12 which extends through the top of the framework 10 and projects above the upper surface of the wing. The jet pipe terminates in a rearwardly directed jet nozzle 13 above the wing upper surface and lying in a plane to the rear of the wing leading edge but forward of the wing front spar. Each jet piper 12 where it projects above the wing upper surface is provided with a fairing 8a on its upstream side, the fairing tapering in an upstream direction and merging into the nacelle 8 enclosing the engine 7.

Each nozzle 13 is disposed so that the jet stream 14 therefrom is, under normal conditions of flight, discharged rearwardly over the wing clear of its upper surface as shown in FIGURE 2. The nozzle is accordingly spaced above the wing surface, the arrangement being such that the jet stream is not diverted from its rearward direction of discharge.

Figure 4:
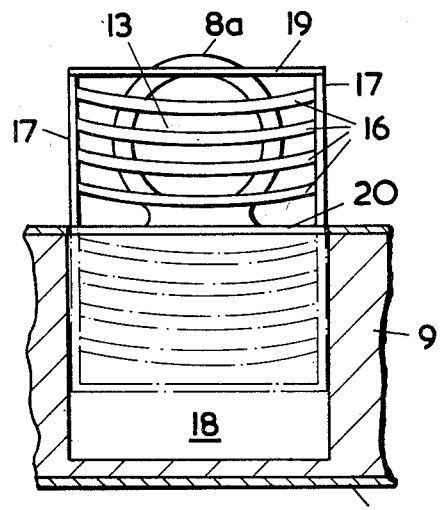
FIGURE 4 is a fragmentary sectional view on the line IV—IV in FIGURE 3.

Provision is made for diverting the jet stream 14 of each engine 7 from its normal rearward direction of discharge downwardly on to the wing upper surface. This is effected by a jet deflector 15 consisting of a cascade of aerofoil vanes 16 extending spanwise of the wing and mounted between two end supports 17. In its inoperative position the jet deflector is housed in a recess 18 in the front main spar as shown in FIGURE 2. The deflector can slide in recess 18 and can be extended to an operative position as shown in FIGURE 3 with the vanes 16 extending in a spanwise sense across the path of the jet stream with their concave faces towards the wing upper surface. As shown in FIGURE 4 the vanes 16 are bowed towards the wing surface between the end supports 17. The jet deflector also includes plates 19, 20 which lie flush with the wing upper surface to close the recess 18 when the jet deflector is in its inoperative and operative positions respectively.

Each engine has its own deflector but in some cases there might be a single jet deflector for all the engines of a wing. The or each jet deflector might comprise a single vane rather than a cascade of vanes.

In normal forward flight, e.g. under cruising conditions, the jet deflectors are retracted to their inoperative positions within the wings and the jet streams are then discharged rearwardly clear of the wing as shown in FIGURE 2. When increased lift is required, e.g. for take-off and landing, the jet deflectors are extended to their operative positions. The jet streams are thereby deflected downwardly at an angle to the wing upper surface and impinge obliquely thereon as shown in FIGURE 3. The streams spread out laterally across the wing span, this spreading being assisted by the bowing of the vanes, so that the jet stream from each engine leaves the wing trailing edge as a long thin spanwise extending jet sheet. The engines may in some cases be arranged so that the jet sheets are contiguous at the wing trailing edge, in which case, as shown in FIGURE 1, they may together extend continuously along a considerable part, preferably a major part, of the wing trailing edge. However in other cases the jet sheets may not meet but will leave gaps between them, in which case the combined spanwise extent of the jet sheets may be somewhat greater, e.g. they may extend along substantially the full span of the wing from root to tip.

The trailing edge wing flap 6 extends along the wing span at least as far as the jet sheets. When the jet streams are deflected on to the wing surface the flap is lowered as shown in FIGURE 3 and it then serves to deflect the jet sheets downwardly due to what is known as Coanda effect, the flap upper surface being shaped accordingly. The combined jet sheets follow the flap upper surface and are discharged from the flap trailing edge in a downwardly inclined direction to constitute a jet flap which interacts with the main stream flow over the wing in such a way that the aerodynamic pressure distribution around the wing is modified and a substantial increase in lift obtained, the magnitude of the lift being dependent on the setting of the flap.

The flap may possibly need only to be of sufficient chord to effect the deflection of the jet sheet, and as shown in the drawings may be of shorter chord than is usual in aircraft practice. Thus its chord might be no more than 10–15% and possibly as little as 2–5% of the total local wing chord.

Since the jet streams are clear of or at the most only just touching the wing except when deflected for increasing lift, the ducting and other frictional losses which are unavoidable in the arrangements of the earlier proposals referred to above are at least to some extent avoided.

There may be a considerable load on the jet deflector when it is in its operative position and the arrangement described ensures that the load is transmitted directly to the front main spar of the wing.

An alternative jet deflector to that shown in FIGURES 2–4 consists of a member having a surface which when the member is in its operative position contacts the undersurface of the rearwardly discharged jet stream and curves away therefrom in a downstream direction towards the wing upper surface. It may also curve away towards the wing surface in a spanwise sense on each side of the jet stream. Due to Coanda effect the stream is induced to follow the curved surface downwardly and in spanwise sense on each side of the jet stream to impinge on the upper surface and form a jet sheet in a manner already described. Such a deflecting device may be housed in a recess in the main spar from which it may be extended in the same way as the jet deflector previously described.

Yet a further embodiment is shown in FIGURES 5 and 6 in which the engines are mounted in pods 21 supported by struts 22 above the wing leading edge. Each jet nozzle has mounted thereon a jet deflector in the form of a pivoted shutter 23. In normal forward flight under cruising conditions the shutter lies outside the path of the jet stream 24 which is accordingly discharged rearwardly above and clear of the wing as shown in FIGURE 5. When increased lift is required the shutter is moved to the position shown in FIGURE 6 so that the jet stream is deflected downwardly to impinge obliquely on and spread out laterally across the wing to form a jet sheet in the manner previously described. At the same time the trailing edge wing flap 25 is lowered so that the jet sheet is discharged in downwardly inclined direction as a jet flap. In this embodiment the flap is of more conventional dimensions, e.g. it may have a chord which is as much as 30–35% of the total local wing chord.

The invention also extends to aircraft with greater or smaller numbers of engines than in the specific examples described above, including an aircraft with only two engines, one in each wing.

Each of the jet engines is preferably of the known by-pass type, i.e. it comprises a low pressure or by-pass compressor, a high pressure compressor, a combustion system and a turbine assembly in driving connection with the compressors. The low pressure compressor is connected to deliver part of its output to the high pressure compressor and the remainder to a duct by-passing the high-pressure compressor, combustion system and turbine assembly, the by-pass air stream and the turbine exhaust gas stream together forming a propulsive jet stream. Preferably the engines have a high by-pass ratio which may be of the order of 1:1 or more. The jet stream of such an engine is relatively cool so that heating of the wing upper surface is minimised.

The aircraft may be in accordance with British patent specification No. 790,193 with a tailplane volume which is such that the neutral point of the aircraft is to the rear of the mid-chord point of the wings. Each wing flap may be mounted as shown in the drawings to turn about a pivotal axis within its thickness, or it may be mounted to turn about an axis below the wing, possibly a virtual axis, as described and illustrated in British patent specification No. 787,011.

The flaps in opposite wings may be operable to deflect the jet sheets from opposite wings upwardly and downwardly either together or differentially in the manner described and illustrated in co-pending patent application Serial No. 609,450 filed September 12, 1956, now Patent No. 2,978,204, in the name of the present inventor to perform the functions normally performed separately by flaps, elevators and ailerons.

I claim:

1. An aircraft comprising a wing, said wing comprising a wing flap at the wing trailing edge; at least one jet engine mounted on the wing, said engine having a rearwardly directed jet nozzle located above the wing upper surface, said nozzle being disposed to discharge a jet stream in a rearward direction above and clear of the wing upper surface; and a jet deflector operatively associated with said nozzle and movable between an inoperative position in which it is housed within the wing and an operative position in which it deflects the jet stream from said rearward direction to a direction downwardly inclined therefrom such that the stream impinges obliquely on said wing upper surface whereby the stream spreads out laterally across the surface in a spanwise sense and leaves the wing trailing edge as a long thin spanwise-extending jet sheets.

2. An aircraft according to claim 1 wherein the jet deflector comprises at least one vane which when the jet deflector is in its operative position extends in a spanwise sense relative to the wing across the jet stream, the vane being shaped to deflect the jet stream downwardly towards the wing upper surface.

3. An aircraft according to claim 2 wherein the vane is bowed towards the wing upper surface intermediate its ends.

4. An aircraft according to claim 1 wherein the jet deflector comprises a cascade of vanes which when the jet deflector is in its operative position extend in a spanwise sense relative to the wing across the jet stream, the vanes being shaped to deflect the jet stream downwardly towards the wing upper surface.

5. An aircraft according to claim 4 wherein each vane is bowed towards the wing upper surface intermediate its ends.

References Cited in the file of this patent

UNITED STATES PATENTS

| | | |
|---|---|---|
| 2,734,698 | Straayer | Feb. 14, 1956 |
| 2,891,740 | Campbell | June 23, 1959 |

FOREIGN PATENTS

| | | |
|---|---|---|
| 768,044 | Germany | May 26, 1955 |
| 1,107,311 | France | Aug. 3, 1955 |
| 167,541 | Australia | Apr. 24, 1956 |